United States Patent Office 3,485,845
Patented Dec. 23, 1969

3,485,845
METHYL AND ETHYL 6- AND 7-SUBSTITUTED 4-HYDROXY-QUINOLINE-3-CARBOXYLATES USEFUL AS COCCIDIOSTATS
Michael Davis, Upminster, Edgar William Parnell and Brian William Sharp, Romford, and Dennis Warburton, Upminster, England, assignors to May & Baker Limited, Dagenham, England, a British company
No Drawing. Filed May 10, 1967, Ser. No. 637,359
Claims priority, application Great Britain, May 13, 1966, 21,396/66; Aug. 4, 1966, 35,037/66; Mar. 31, 1967, 14,796/67
Int. Cl. C07d 33/48
U.S. Cl. 260—287
8 Claims

ABSTRACT OF THE DISCLOSURE

The invention provides new methyl and ethyl 6,7-dialkoxy-4-hydroxyquinoline-3-carboxylates in which the 6-alkoxy group contains 8 to 10 carbon atoms and the 7-alkoxy group contains 1 to 3 carbon atoms or is sec-butoxy, which new compounds are potent coccidiostats useful in the prevention of coccidiosis in chickens caused by parasites of the genus Eimeria. The new compounds also possess a useful degree of activity against certain viruses capable of causing influenza in chickens.

---

This invention relates to quinoline derivatives useful in the prevention of coccidiosis, to their preparation, to compostions containing them, and to their use.

Coccidiosis in chickens is caused by protozoan parasites of the genus Eimeria. This disease is a very important cause of economic loss in chicken flocks, especially when the latter are raised under intensive conditions. It occurs all over the world wherever the poultry are reared, and, when left untreated, often causes extensive loss of fowl. This loss results not only from death of the infected birds but also from the general deterioration in the health of the chickens which shows itself in depression of body growth rate and reduction in food conversion efficiency. The prevention of coccidiosis is accordingly of considerable economic importance in successful chicken raising. Hitherto, the disease has been controlled by the use of anti-coccidial drugs which are generally administered either in the feed or in drinking water. These drugs act by inhibiting or slowing down the multiplication of Eimeria within the bird. Examples of successful coccidiostats which have been used commercially are 1-(4-amino-2-n-propyl-5-pyrimidinylmethyl)-2-picolinium chloride hydrochloride (amprolium), 3,5 - dinitro-o-toluamide (zoalene), 2-sulphanilamidoquinoxaline (sulphaquinoxaline), and 5-nitro-2 - furfuraldehydesemicarbazone (nitrofurazone) all of which show a certain degree of activity against the five species if Eimeria generally regarded as being responsible for the economical losses caused by coccidiosis in chickens, namely E. tenella, E. acervulina, E. necatrix, E. brunetti and E. maxima. However, it has been found that even minor alterations in the chemical structure of these comparatively effective coccidiostats substantially alters their usefulness and in many instances reduces the activity to such a degree that the compounds can no longer be used. Moreover, the coccidiostats in current commercial use suffer in general from the disadvantage that they are not effective against all the aforesaid five species of Eimeria when administered in practical concentrations so that no one coccidiostat gives complete protection against all these five pathogenic species of Eimeria. Since it is neither possible to forecast which species of Eimeria is likely to be encountered in any given context, nor the severity of the challenge, this narrow spectrum of activity is a severe disadvantage in currently used coccidiostats.

In the past, infections caused by E. tenella, which is responsible for a severe infection of the cecum of chickens, and E. necatrix, which frequently cause death, have been regarded as more important than infections caused by the other three species, which do not ordinarily cause death of the infected fowl, but do cause economic loss. Nevertheless, in recent years the incidence of infections caused by E. acervulina, E. maxima and E. brunetti has increased, thereby increasing the importance of coccidiostats which are effective against these three species as well as the other two. While it is possible to use two or more coccidiostats simultaneously to ensure the desired wide spectrum of activity against all these five pathogenic species of Eimeria, this necessarily results in an increase in the total concentration of coccidiostat in the feed or drinking water given to the chickens and also in an increase in the cost of medication. A further additional problem which has been encountered is the emergence of strains of the various species of Eimeria which are resistant to known coccidiostats.

Recently, United States Patent No. 3,267,106 (granted Aug. 16, 1966, to Edward John Watson) has disclosed a class of lower alkyl esters of 6,7-di-lower-alkoxy-4-hydroxy-3-quinoline carboxylic acids which are stated to be useful in the treatment of coccidiosis caused inter alia by E. tenella, E. acervulina and E. necatrix. The compounds disclosed in the said patent have the following formula:

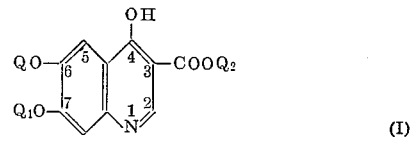

(I)

in which Q and $Q_1$ are each alkyl of 2 to 4 carbon atoms and $Q_2$ is lower alkyl. A more detailed account of the anticoccidial effect of the compounds of this patent has appeared in J. Med. Chem. (9, 934–936, 1996). In the latter article it is stated that one of the most active compounds disclosed in the said patent is ethyl 4-hydroxy-6,7-di-isobutoxy-3-quinoline carboxylate (called "buquinolate"). The article states that the presence of branched alkoxy groups in the 6- and 7-positions confers greater activity than the presence of n-alkyloxy groups. It also discloses that the compound of the above formula in which Q and $Q_1$ are both methyl and $Q_2$ is ethyl is inactive. The article provides figures for the "minimum effective dose" of all twenty-seven compounds tested. It is stated that "a compound is considered to be effective if the number of deaths in the untreated control group is statistically significantly greater than that of the treated group." Clearly, the concentration at which a compound is effective by this criterion may be very much less than the concentration which would have to be administered in commercial practice in order to obtain an acceptable degree of control of coccidiosis. On this basis, it is clear from the figures given in the said article that, inter alia, the compound in which Q and $Q_1$ are both n-butyl and $Q_2$ is ethyl and the compound in which Q and $Q_1$ are both n-decyl and $Q_2$ is methyl are of relatively very low activity in comparison with buquinolate.

A further disclosure of 4-hydroxyquinoline derivatives stated to have anti-coccidial activity has appeared in Belgian Patent No. 677,592 (granted Oct. 4, 1966, to Imperial Chemical Industries Ltd.) which discloses the compounds of the formula:

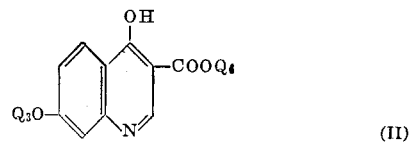

(II)

In this formula $Q_3$ is substituted or unsubstituted alkyl, aryl or aralkyl, $Q_4$ is alkyl, and the quinoline nucleus may optionally be substituted by one or more additional substituents. One group stated to be preferred consists of the compounds in which $Q_3$ is benzyl optionally substituted by chlorine, $Q_4$ is methyl or ethyl, and the quinoline nucleus is substituted in the 6-position by alkoxy of 1 to 4 carbon atoms.

Extensive research and experimentation into 4-hydroxyquinoline derivatives has, however, shown that, as is the case with other types of chemical compounds having anti-coccidial activity, both the nature and the degree of the useful anti-coccidial effect (if any) can be radically altered even by apparently small changes in chemical structure. It has already been pointed out that compounds of Formula I in which Q and $Q_1$ are both methyl or decyl have only low activity. We have also found that the compound of Formula I in which Q and $Q_1$ are both n-octyl and $Q_2$ is ethyl is of relatively very low activity. It therefore appears that increasing the size of the alkyl groups Q and $Q_1$, in the compounds of Formula I leads to loss of activity. This is so even if only one of the alkyl groups is of increased size. For example, the compounds ethyl 6-n-hexyloxy-4-hydroxy-7-methoxyquinoline-3 - carboxylate and ethyl 4-hydroxy-7-methoxy-6-n-pentyloxyquinoline-3-carboxylate both have relatively very low activity.

Similarly, it has been found that even small alterations in the structure of the preferred class of compounds of Formula II disclosed in the above-mentioned Belgian patent lead to compounds having relatively very low activity. Thus, the compound of Formula II in which $Q_3$ is benzyl and $Q_4$ is ethyl and the quinoline nucleus is substituted in the 6-position by a further benzyloxy radical is of relatively very low activity. Similarly, if the 6-position of the quinoline nucleus is substitued by benzyloxy and the 7-position by lower alkoxy such as methoxy, again compounds of relatively very low activity are produced, as in the compound ethyl 6-benzyloxy-4-hydroxy-7-methoxyquinoline-3-carboxylate. In fact, a very substantial number of the compounds broadly covered by the Belgian patent, but outside the specific preferred classes mentioned therein, have been found to be practically devoid of a useful degree of activity.

We have now discovered as a result of a very extensive programme of research and investigation that the quinoline derivatives of the general formula:

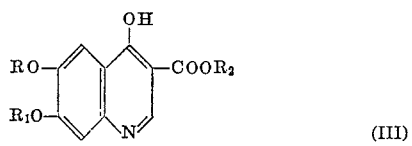

(III)

in which R is n-alkyl of 8 to 10 carbon atoms, $R_1$ is methyl, ethyl, n-propyl, isopropyl or sec-butyl, and $R_2$ is methyl or ethyl, have a very high order of useful anti-coccidial activity. The structure of the compounds of Formula III has been found to be highly specific. Thus, the compound, ethyl 4-hydroxy-6-methoxy-7-n-octyloxyquinoline-3-carboxylate, having a large alkoxy group in the 7-position and a small alkoxy group in the 6-position, is of relatively low activity. Again, increase in the size of the group R leads to compounds of relatively very low activity as in the compound ethyl 6-n-dodecyloxy-4-hydroxy-7-methoxyquinoline-3-carboxylate. Even more surprisingly, replacement of the radical R by a branched chain alkyl group leads to a great reduction of activity, contrary to the teachings of the above-mentioned article in J. Med. Chem. For example, the compounds of Formula III in which $R_1$ is methyl, $R_2$ is ethyl and R is respectively $(C_2H_5)_2CHCH_2—$, $(CH_3)_2CHCH_2—CH_2CH(CH_3)—$ $CH_3CH_2CH_2CH_2CH_2CH(C_2H_5)—$ $(CH_3)_3CCH_2CH(CH_3)CH_2CH_2—$ or $(CH_3)_2CHCH_2CH_2CH_2CH(CH_3)CH_2CH_2—$ are all of relatively very low activity.

The new coccidiostats of Formula III are effective againsts all the aforementioned species of Eimeria which cause coccidiosis in chickens. When administered to chickens in food, they are in general effective in dosages from 0.0001% to 0.05% of the total weight of the food, a concentration of from 0.001% to 0.004% being preferred for the most active compounds. The specific preferred compounds are ethyl 4-hydroxy-7-isopropoxy-6-n-octyloxyquinoline-3-carboxylate, methyl 4-hydroxy-7-isopropoxy-6-n-octyloxyquinoline-3-carboxylate, methyl 7 - ethoxy-4-hydroxy-6-n - octyl - oxyquinoline - 3 - carboxylate, methyl 6-n-decyloxy-7-ethoxy-4-hydroxyquinoline-3 - carboxylate and ethyl 6-n-decyloxy-7-ethoxy-4-hydroxyquinoline-3-carboxylate, the last being of outstanding value.

It has further unexpectedly been found that the compounds of Formula III have a valuable anti-viral effect, especially against certain myxoviruses capable of producing influenza in poultry. This property is especially advantageous as there are at present no known drugs for this type of disease, and anti-viral effects have not been reported for the compounds of Formulas I and II. More specifically, the compounds of Formula III have been shown to possess a useful degree of anti-viral activity against the virus $A_2$ Turkey/England/1963, which has been shown to be responsible for serious outbreaks of influenza in chicks. This effect is particularly marked in ethyl 6 - n - decyloxy - 7-ethoxy-4-hydroxyquinoline-3-carboxylate. The compounds of Formula III are thus effective against one of the most important causes of economic loss in poultry flocks, namely coccidiosis caused by Eimeria, and also against viral influenza, a disease causing a high morbidity among affected chicken flocks.

The new compounds of Formula III may be prepared by the cyclisation of anilinomethylenemalonate derivatives of the general formula:

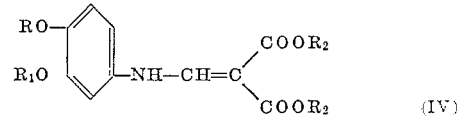

(IV)

wherein R, $R_1$ and $R_2$ are as hereinbefore defined, by known methods for the formation of quinoline derivatives from anilinomethylenemalonates. Cyclisation may be effected for example, by treatment with an acid reagent, e.g. a mixture of acetic anhydride and sulphuric acid, or by heating the compound of Formula IV at elevated temperature, for example from 18 to 350° C., and more particularly at from 200 to 280° C., advantageously in a suitable high boiling point solvent, for example a mineral oil, "Dowtherm," or "Diphyl."

The derivatives of Formula IV may be prepared:
(i) by reaction of an aniline of the general formula:

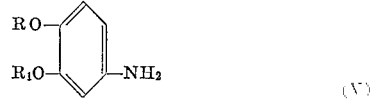

(V)

(wherein R and $R_1$ are as hereinbefore defined) with a dialkyl alkoxymethylenemalonate of the general formula:

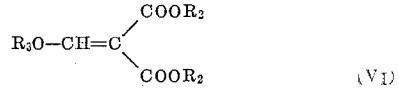

(VI)

wherein $R_2$ is as hereinbefore defined and $R_3$ represents as alkyl group of 1 to 6 carbon atoms, preferably a methyl or ethyl group. Suitable compounds of Formula VI include diethyl ethoxymethylenemalonate and dimethyl methoxymethylenemalonate. Reaction may be effected in the absence or presence of a suitable solvent such as a lower alkanol, e.g. ethanol, at laboratory temperature or with gentle heating. The reaction product of Formula IV may, if desired, be separated by filtration or concentration of the reaction medium and, if desired, purified by crystallisation from a suitable solvent, e.g. ethanol or benzene;

(ii) by treatment of a formamidine of the general formula:

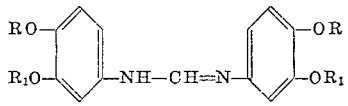

(wherein R and R₁ are as hereinbefore defined) with an alkyl orthoformate and an alkyl malonate, e.g. by the method of L. Levai et al., J. Org. Chem., 1966, 31, 4003.

The formamidines of Formula VII may be prepared from an aniline of Formula V by treatment with an alkyl orthoformate, e.g. by the method of C. C. Price et al., J. Amer. Chem. Soc., 1946, 68, 1251.

The compounds of Formula III may also be prepared by the replacement by known methods of a labile atom or group A in quinoline compounds of the general formula:

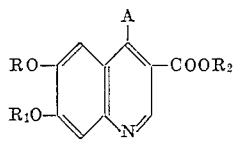

(wherein R, R₁ and R₂ are as hereinbefore defined and A represents an atom or group readily replaceable by a hydroxyl group, such as a halogen atom, an amino or mercapto group, an alkoxy, alkylthio, or an alkane-sulphonyl group of 1 to 6 carbon atoms, or a sulphonic acid group) by a hydroxyl group. Preferably A represents a chlorine atom and the compound of Formula VIII is obtained, for example, by treating a compound of Formula IV with phosphorus oxychloride. The resultant 4-chloro compound is then hydrolysed, preferably with acid, to give the required compound of Formula III, for example by boiling in acetic acid solution buffered with sodium acetate. The intermediate 4-chloro compound of Formula VIII may, if desired, be separated before hydrolysis, by known methods, from the reaction mixture in which it has been prepared or, alternatively, hydrolysed without being isolated after removal of excess phosphorus oxychloride. When the symbol A in Formula VIII represents a mercapto or alkylthio group, replacement of A by a hydroxyl group is preferably effected by contacting the compound of Formula VIII with an acidic medium, e.g. aqueous acetic acid, in the presence of an oxidizing agent, e.g. hydrogen peroxide.

The compounds of Formula VIII wherein A represents a halogen atom may also be prepared by reacting compounds of the general formula:

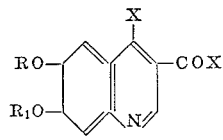

wherein R and R₁ are as hereinbefore defined and X represents a halogen (preferably chlorine) atom, with alcohols of the formula R₂OH, wherein R₂ is as hereinbefore defined.

The compounds of Formula IX may be prepared from quinoline-3-carboxylic acid compounds of the general formula:

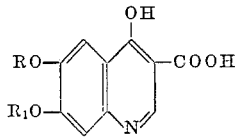

wherein R and R₁ are as hereinbefore defined, by known methods for the conversion of hydroxy carboxylic acids into the corresponding halogeno acid halides, for example by treatment with a phosphorus halide e.g. phosphorus oxychloride.

The compounds of formula X may be obtained:

(i) by the hydrolysis of a corresponding amide or ester, e.g. a compound of Formula III, for example by heating with a base such as sodium hydroxide in aqueous alcoholic solution, for example in aqueous ethanol, and recovering the acid of formula X by acidification of the solution formed;

(ii) by the hydrolysis of a corresponding nitrile of the general formula:

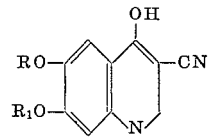

wherein R and R₁ are as hereinbefore defined, e.g. with alkali or acid by the method of C. C. Price et al., J. Amer. Chem. Soc., 1946, 68, 1251. The nitrile of Formula XI may be obtained by the cyclisation of an α-cyano-β-anilinoacrylate of the general formula:

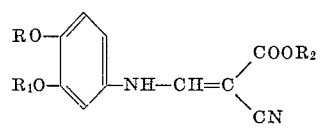

wherein R, R₁ and R₂ are as hereinbefore defined. Cyclisation is preferably effected by heating the compound of Formula XII at elevated temperature, for example from 180 to 350° C., and more particularly at from 200–280° C., in a suitable high boiling point solvent, for example a mineral oil, "Dowtherm" or "Diphyl."

The derivatives of Formula XII may be prepared by reaction of an aniline of Formula V with an alkyl orthoformate and an alkyl cyanoacetate, e.g. by the method of R. H. Baker et al., J. Amer. Chem. Soc., 1949, 71, 3060, or by reaction of an aniline of Formula V with an alkyl alkoxymethylene cyanoacetate, e.g. by the method of C. C. Price et al., J. Amer. Chem. Soc., 1946, 68, 1251.

The compounds of Formula III may also be prepared by reaction of compounds of Formula X with alcohols of formula R₂OH, wherein R₂ is as hereinbefore defined. Reaction is preferably effected in the presence of a catalyst such as sulphuric acid, hydrogen chloride or boron trifluoride, the last named being conveniently used in the form of a complex with an ether such as that formed with dimethyl or diethyl ether.

The compounds of Formula III may also be obtained by transesterification of esters of compounds of Formula X in which the alcoholic residue of the ester is alkyl of 1 to 6 carbon atoms, aralkyl, e.g. benzyl, or aryl, e.g. phenyl. Preferably the starting ester is itself a compound of Formula III. Transesterification may be effected by treating the starting ester with the appropriate alcohol R₂OH, wherein R₂ is as hereinbefore defined and is different from the alcoholic residue of the ester starting material, in the presence of a catalyst such as sulphuric acid, hydrogen chloride or boron trifluoride, the last named being conveniently used in the form of a complex, such as that formed with dimethyl or diethyl ether.

Compounds of Formula III can further be prepared by alkylation of the hydroxy group in the 7-position of quinoline compounds of the general formula:

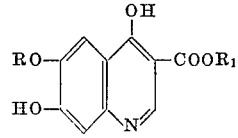

(wherein R and R₂ are as hereinbefore defined) with a reactive ester of the formula R₁X₁ (wherein X₁ is a halogen atom or the acid residue of a reactive ester such as toluene-p-sulphonate, and R₁ is as hereinbefore defined).

The derivatives of Formula XIII may be prepared by hydrolysis of an acyl derivative of the general formula:

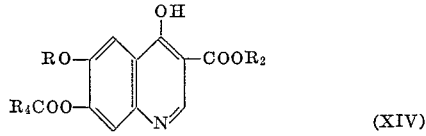

(XIV)

(wherein R and R₂ are as hereinbefore defined and R₄ represents an alkyl group of 1 to 6 carbon atoms, an aralkyl group of 7 to 10 carbon atoms or an aryl group of 6 to 10 carbon atoms), for example by treatment with an alkali metal bicarbonate in a lower aliphatic alcohol.

The quinolines of Formula XIV are themselves obtained by cyclisation of an aniline derivative of the general formula:

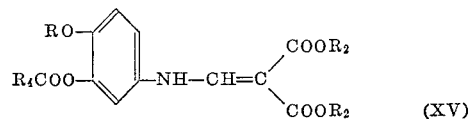

(XV)

(wherein R, R₂ and R₄ are as hereinbefore defined), preferably by heating at an elevated temperature, for example from 180–350° C., and more particularly at from 200–280° C., in a suitable high boiling point solvent, for example a mineral oil, "Dowtherm" or "Diphyl."

The aniline derivatives of Formula XV are obtained by known methods by reaction of an aniline of the general formula:

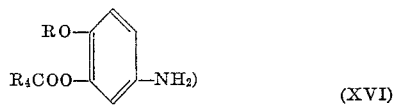

(XVI)

(wherein R and R₄ are as hereinbefore defined) with a dialkyl alkoxymethylenemalonate of the general Formula VI.

Compounds of Formula III may also be prepared by reduction by known methods of compounds of the general formula:

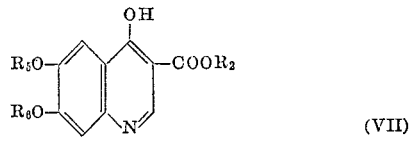

(VII)

wherein R₅ and R₆ represent respectively either the groups R and R₁, or unsaturated hydrocarbon groups convertible into them by reduction (e.g. allyl in the case of R₆), such that at least one of the groups R₅ and R₆ is an unsaturated hydrocarbon group as defined above. The reduction may be carried out by known methods, for example by treatment with hydrogen in an inert solvent, e.g. acetic acid or ethanol, in the presence of a suitable hydrogenation catalyst, for example palladium on charcoal.

Compounds of Formula XVII where one or both of the groups R₅ and R₆ represent unsaturated hydrocarbon groups may be prepared by application of methods already described for compounds of the Formula III, for example from an anilinomethylenemalonate derivative of the general formula:

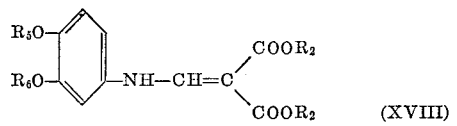

(XVIII)

wherein R₂, R₅ and R₆ are as hereinbefore defined, one or both of R₅ and R₆ representing an unsaturated hydrocarbon group. Compounds of Formula XVIII are themselves obtained by application of methods already described for analogous compounds of Formula IV utilizing an aniline of the general formula:

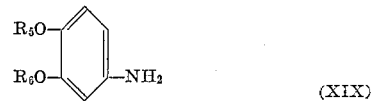

(XIX)

wherein R₅ and R₆ are as hereinbefore defined, as starting material.

Salts, e.g. alkali metal salts, of the compounds of Formula III may be obtained by known methods, for example by treatment of a compound of Formula III in solution or suspension in a suitable solvent, e.g. dimethylformamide, with an equivalent or excess quantity of a base, e.g. an alkali metal hydroxide or hydride such as sodium or potassium hydroxide or sodium hydride, and recovery of the salt by filtration or evaporation of the solvent.

By the term "known methods" in the present specification is meant methods heretofore used or described in the literature.

The quinoline derivatives of Formula III may also exist in the tautomeric form represented by the formula:

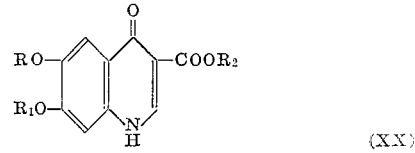

(XX)

(wherein R, R₁ and R₂ are as hereinbefore defined), and it is to be understood that the present invention includes within its scope both tautomeric forms. For purposes of convenience, however, the compounds are described herein in terms of the structural form depicted in Formula III.

The following examples illustrate the preparation of compounds according to the present invention.

EXAMPLE 1

1-(2 - methoxy - 4 - nitrophenoxy)-n-octane (13.0 g.) in ethyl acetate (65 ml.) was catalytically reduced with hydrogen in the presence of 5% palladium on charcoal (1.3 g.) at atmospheric pressure and room temperature. The solution obtained after the theoretical hydrogen absorption had occurred, containing 1-(4-amino-2-methoxyphenoxy)-n-octane, was filtered, treated with diethyl ethoxymethylenemalonate (10.5 g.) and the mixture evaporated to dryness on a steam bath in vacuo. The product, diethyl 3-methoxy-4-n-octyloxyanilinomethylenemalonate, crystallised (M.P. 48–50° C.) and was dissolved in "Dowtherm A" (130 ml.) and the solution heated in a Woods metal bath at 260–270° C. for 1 hour. The cooled solution was diluted with light petroleum (B.P. 60–80° C.) and the crude product filtered off and dried. Recrystallisation by dissolving in boiling acetic acid (50 ml.), filtering whilst hot and precipitating the product by the addition of boiling methanol (100 ml.) gave ethyl 4-hydroxy-7-methoxy-6-n-octyloxyquinoline-3-carboxylate (4.95 g.), M.P. 256–258° C.

The 1-(2-methoxy-4-nitrophenoxy)-n-octane used as starting material in the above preparation was prepared according to the method of R. F. Collins and M. Davis. J. Chem. Soc. 1961, 1863, as follows:

Potassium p-nitroguaiacoxide (103.6 g.) in dimethylformamide (515 ml.) was treated with n-octyl bromide (95 ml.), heated with stirring on a steam-bath for 1 hour, poured into water and the product filtered off. Crystallisation from methanol (500 ml.) gave 1-(2-methoxy-4-nitrophenoxy)-n-octane (116 g.), M.P. 36.5–38° C.

Proceeding in a similar manner to that described above for the preparation of ethyl 4-hydroxy-7-methoxy-6-n-octyloxyquinoline-3-carboxylate but replacing the 1-(4-amino-2-methoxyphenoxy)-n-octane by the appropriate aminophenoxyalkane derivative obtained by the reduction of the corresponding nitrophenoxyalkane, itself prepared by the method of R. F. Collins and M. Davis, J. Chem. Soc., 1961, 1863 from the corresponding potassium 2-alkoxy-4-nitrophenoxide and the appropriate alkyl halide, the following compounds were obtained:

Ethyl 7-ethoxy-4-hydroxy-6-n-octyloxyquinoline-3-carboxylate, M.P. 250–251° C. (from 1-(2-ethoxy-4-nitrophenoxy)-n-octane, M.P. 49–50° C.);

Ethyl 4-hydroxy-7-methoxy-6-n-nonyloxyquinoline-3-carboxylate, M.P. 258–260° C. (from 1-(2-methoxy-4-nitrophenoxy)-n-nonane, M.P. 47.5–49° C.);

Ethyl 6-n-decyloxy-4-hydroxy-7-methoxyquinoline-3-carboxylate, M.P. 250–252° C. (from 1-(2-methoxy-4-nitrophenoxy)-n-decane, M.P. 49–50° C.);

Ethyl 6-n-decyloxy-7-ethoxy-4-hydroxyquinoline-3-carboxylate, M.P. 244–246° C. (from 1-(2-ethoxy-4-nitrophenoxy)-n-decane, M.P. 57.5–59° C.); and Ethyl 6-n-decyloxy-4-hydroxy-7-isopropoxyquinoline - 3 - carboxylate, M.P. 194–196° C. (from 1-(2-isopropoxy-4-nitrophenoxy)-n-decane, M.P. 45.5–47.5° C.).

EXAMPLE II

Proceeding as described in Example I, 1-(2-ethoxy-4-nitrophenoxy)-n-decane (10.2 g.) was reduced and the 1 - (4-amino-2-ethoxyphenoxy) - n - decane obtained was converted into diethyl 4-n-decyloxy - 3 - ethoxyanilinomethylenemalonate, M.P. 38–40° C., by treatment with diethyl ethoxymethylenemalonate (6.8 g.), and cyclised in boiling "Dowtherm A" to give crude ethyl 6-n-decyloxy-7-ethoxy-4-hydroxyquinoline-3-carboxylate (7.1 g.). A sample, recrystallised from acetic acid and methanol, as described in Example I, melted at 244–246° C.

The 1-(2-ethoxy-4-nitrophenoxy)-n-decane used as starting material in the above preparation was prepared as follows:

4-nitrocatechol mono-sodium salt (17.2 g.) was dissolved in dimethylformamide (180 ml.) and n-decyl bromide (22.1 g.) was added. The mixture was stirred and heated on a steam-bath for 1 hour and poured into water (1 litre). The precipitated solid was filtered off and dissolved in the minimum of boiling methanol. The solution was treated with sodium hydroxide solution (7.0 ml., 50% w./w.) and diluted with water (500 ml.). The mixture was clarified with charcoal and filtered. The filtrate was acidified with concentrated hydrochloric acid (15 ml.) and the precipitated oil extracted with diethyl ether. The extracts were washed with water, dried over anhydrous sodium sulphate and evaporated and the residue recrystallised from light petroleum (B.P. 40–60° C.) to give 1-(2-hydroxy-4-nitrophenoxy)-n-decane (11.3 g.), M.P. 46–49° C.

1-(2-hydroxy-4-nitrophenoxy)-n-decane (10.8 g.) was dissolved in dimethylformamide (50 ml.) and the solution treated with sodium hydride (1.95 g., 50% suspension in oil). The mixture was heated on the steam-bath for 5 minutes, then treated with ethyl toluene-p-sulphonate (8.0 g.) dissolved in dimethylformamide (50 ml.). After heating for a further 1 hour, the mixture was poured into ice-cold water (500 ml.), made alkaline with sodium hydroxide solution, and the solid product filtered off. Crystallisation from methanol gave 1 - (2 - ethoxy - 4 - nitrophenoxy)-n-decane (10.7 g.), M.P. 50–55° C. A sample, recrystallised from methanol, melted at 53–55° C.

The following compounds were prepared in a similar manner:

(a) Ethyl 4-hydroxy-6-n-octyloxy-7-n-propoxyquinoline-3-carboxylate, M.P. 252–254° C., from 1-(2-n-propoxy-4-nitrophenoxy)-n-octane, M.P. 52–53° C., itself prepared from 1-(2-hydroxy-4-nitrophenoxy)-n-octane, M.P. 46–49° C., and n-propyl bromide.

The 1-(2-hydroxy-4-nitrophenoxy)-n-octane was prepared by the procedure described above from 4-nitrocatechol mono-sodium salt and n-octyl bromide.

(b) Ethyl 4-hydroxy-7-isopropoxy-6-n-octyloxyquinoline-3-carboxylate, M.P. 215–217° C., from 1-(2-isopropoxy-4-nitrophenoxy)-n-octane, M.P. 43–44° C., itself prepared from 1-(2-hydroxy-4-nitrophenoxy) - n - octane and isopropyl bromide;

(c) Ethyl 4-hydroxy-7-isopropoxy-6-n-nonyloxyquinoline-3-carboxylate, M.P. 203–205° C., from 1-(2-isopropoxy-4-nitrophenoxy)-n-nonane, M.P. 43–45° C., itself prepared from 1-(2-hydroxy-4-nitrophenoxy)-n-nonane, M.P. 42–45° C., and isopropyl bromide. The 1-(2-hydroxy-4-nitrophenoxy)-n-nonane was prepared by the procedure described above from 4-nitrocatechol monosodium salt and n-nonyl bromide;

(d) Ethyl 7-ethoxy-4-hydroxy-6-n-nonyloxyquinoline-3-carboxylate, M.P. 243–245° C., from 1-(2-ethoxy-4-nitrophenoxy)-n-nonane, M.P. 40–42° C., itself prepared from 1-(2-hydroxy-4-nitrophenoxy)-n-nonane, M.P. 42–45° C., and ethyl toluene-p-sulphonate. The 1-(2-hydroxy-4-nitrophenoxy)-n-nonane was prepared by the procedure described above in (c);

(e) Ethyl 7-sec.-butoxy-6-n-decyloxy-4-hydroxyquinoline-3-carboxylate, M.P. 177–179° C., from 1-(2-sec.-butoxy-4-nitrophenoxy)-n-decane, M.P. 33–36° C., itself prepared from 1-(2-hydroxy-4-nitrophenoxy) - n - decane and sec.-butyl bromide. The 1-(2-hydroxy-4-nitrophenoxy)-n-decane was prepared as described above;

(f) Ethyl 6-n-decyloxy-4-hydroxy-7-n-propoxyquinoline-3-carboxylate, M.P. 244–245° C., from 1-(4-nitro-2-n-propoxyphenoxy)-n-decane, M.P. 59–61° C., itself prepared from 1-(2-hydroxy-4-nitrophenoxy)-n-decane and n-propyl bromide. The 1-(2-hydroxy-4-nitrophenoxy)-n-decane was prepared as described above.

EXAMPLE III 1-(2-methoxy-4-nitrophenoxy)-n-decane (154 g.; prepared as described in Example I) was reduced with hydrogen in ethyl acetate (1 litre) in the presence of 5% palladium on charcoal catalyst at atmospheric pressure and room temperature to 1-(4-amino-2-methoxyphenoxy)-n-decane. The solution was filtered, treated with diethyl ethoxymethylenemalonate (108 g.) and evaporated under reduced pressure to give diethyl 4-n-decyloxy-3-methoxyanilinomethylenemalonate, M.P. 68° C. This solid was dissolved in phosphorus oxychloride (200 ml.) and heated on the steam-bath for 3 hours. The excess of phosphorus oxychloride was evaporated in vacuo and the residue dissolved in glacial acetic acid (2 litres). The solution was treated with anhydrous sodium acetate (200 g.), heated under reflux, with stirring, for 6 hours and poured into ice-cold water (12 litres). The precipitated solid was filtered off, washed with water and ethanol and dried at about 90° C. to give ethyl 6-n-decyloxy-4-hydroxy-7-methoxyquinoline-3-carboxylate (160 g.), M.P. 240–250° C., which was identical with the product described in Example I. A sample, recrystallised from acetic acid and methanol as described in Example I, melted at 252–256° C.

The following compound was prepared in a similar manner:—ethyl 6-n-decyloxy-4-hydroxy - 7 - isopropoxyquinoline-3-carboxylate, M.P. 194–196° C., from 1-(2-isopropoxy-4-nitrophenoxy)-n-decane, M.P. 45.5–47.5° C., itself prepared by the method described in Example I from 1 - (2-hydroxy-4-nitrophenoxy) - n - decane and isopropyl bromide.

EXAMPLE IV

Ethyl 6-n-decyloxy-7-ethoxy-4-hydroxyquinoline-3-carboxylate (50 g.; prepared as described in Example I) was refluxed in ethanol (500 ml.) and water (500 ml.) containing sodium hydroxide (50 g.) for 1 hour. The solution obtained was diluted with water until just turbid, and filtered hot through Hyflo Supercel. Acidification of the filtrate with concentrated hydrochloric acid gave 6-n-decyloxy-7-ethoxy-4-hydroxyquinoline-3-carboxylic acid (48 g.), M.P. 260–262° C., raised by recrystallisation from dimethylformamide to 263–264° C. This acid (65 g.) was suspended in methanol (1.4 litres), treated with boron trifluoride-diethyl ether complex (65 ml.) and the mixture refluxed and stirred for 1.5 hours. The solution was added to ice-cold water (5 litres) and the solid obtained filtered off, washed with water and recrystallised by dissolving in boiling acetic acid, filtering whilst hot and precipitating the product by the addition of boiling methanol to give methyl 6-n-decyloxy-7-ethoxy - 4 - hydroxyquinoline-3-carboxylate (51 g.), M.P. 247–249° C.

The following compounds were prepared in a similar manner starting with the corresponding ethyl esters (prepared as described in Examples I and II):

Methyl 7-ethoxy-4-hydroxy-6-n-octyloxyquinoline-3-carboxylate, M.P. 251–253° C.;
Methyl 4-hydroxy-7-isopropoxy-6-n-octyloxyquinoline- 3-carboxylate, M.P. 239–241° C.;
Methyl 4-hydroxy-7-methoxy-6-n-nonyloxyquinoline-3-carboxylate, M.P. 245–246° C.;
Methyl 7-ethoxy-4-hydroxy-6-n-nonyloxyquinoline-3-carboxylate, M.P. 247–249° C.;
Methyl 4-hydroxy-7-isopropoxy-6-n-nonyloxyquinoline-3-carboxylate, M.P. 222–225° C.;
Methyl 6-n-decyloxy-4-hydroxy-7-methoxyquinoline-3-carboxylate, M.P. 237–239° C.;
Methyl 4-hydroxy-7-methoxy-6-n-octyloxyquinoline-3 - carboxylate, M.P. 247–249° C., and
Methyl 6-n-decyloxy-4-hydroxy-7-isopropoxyquinoline-3-carboxylate, M.P. 225–227° C.

EXAMPLE V

Diethyl 4 - n - decyloxy - 3 - ethoxyanilinomethylenemalonate (5.0 g.; prepared as described in Example II) and phosphorus oxychloride (4.4 ml.) were heated together on the steam-bath for 3 hours. The excess phosphorus oxychloride was evaporated under reduced pressure, the residue dissolved in methanol (20 ml.) and the solution poured into ice-cold water (100 ml.). The mixture was neutralised with sodium hydroxide solution, the precipitate filtered off, washed with water, dried and recrystallised from light petroleum (B.P. 60–80° C.) to give ethyl 4 - chloro - 6 - n - decyloxy - 7 - ethoxyquinoline-3-carboxylate, M.P. 82.5–83.5° C.

This ester (3.0 g.) was heated under reflux for one hour in glacial acetic acid (30 ml.) containing anhydrous sodium acetate (6.0 g.) and the mixture poured into water (100 ml.). The product was filtered off and recrystallised from acetic acid and methanol, as described in Example I, to yield ethyl 6-n-decyloxy-7-ethoxy-4-hydroxyquinoline-3-carboxylate, M.P. 241–244° C., identical with the product described in Example I.

Similarly prepared was ethyl 4-hydroxy-7-methoxy-6-n-octyloxy-quinoline-3-carboxylate, M.P. 258–260° C.

EXAMPLE VI

A solution of ethyl 6-n-decyloxy-7-ethoxy-4-hydroxyquinoline-3-carboxylate (8.3 g.; prepared as described in Example I) in methanol (300 ml.) and concentrated sulphuric acid (10 ml.) was heated under reflux for 12 hours, then concentrated in vacuo and poured into ice-water. The precipitate was filtered off, washed with water, dried and recrystallised from dimethylformamide, giving methyl 6 - n - decyloxy - 7 - ethoxy - 4 - hydroxyquinoline - 3-carboxylate, M.P. 245–248° C., not depressed by a specimen prepared as in Example IV.

EXAMPLE VII

Ethyl 6-n-decyloxy-7-ethoxy-4-mercaptoquinoline-3-carboxylate (1.0 g.), dissolved in acetic acid (10 ml.), was treated with a solution of hydrogen peroxide (1.2 ml., 30%) in acetic acid (10 ml.). The solution was heated on the steam-bath for 2 hours, treated with a further quantity of hydrogen peroxide (1.2 ml.), and heated for a further 2 hours. The solution was diluted with water and the product extracted with chloroform. Evaporation of the washed and dried extracts gave a solid which was triturated with ethanol, and recrystallised twice from acetic acid to yield ethyl 6-n-decyloxy-7-ethoxy-4-hydroxyquinoline-3-carboxylate, M.P. 235–238° C., undepressed by an authentic sample prepared as described in Example I and having identical characteristics by thin-layer chromatography.

The mercapto compound employed as starting material was obtained as follows:

A solution of sodium (1.01 g.) in dry ethanol (180 ml.) was saturated with hydrogen sulphide. Ethyl 4-chloro-6-decyloxy-7-ethoxyquinoline-3-carboxylate (17.5 g., M.P. 82.5–83.5° C.), prepared as described in Example V, was added to the solution, which was heated under reflux for 1 hour, poured into water and acidified with hydrochloric acid. The product was extracted with chloroform. The washed and dried extract was evaporated and ethyl 6 - n - decyloxy - 7 - ethoxy - 4 - mercaptoquinoline - 3-carboxylate crystallised from ethanol as an orange solid (10.0 g.), M.P. 203–206° C. A sample recrystallised from methanol had M.P. 200° C., resolidifying and M.P. 241° C.

EXAMPLE VIII

A solution of ethyl 6-n-decyloxy-7-ethoxy-4-methylmercaptoquinoline-3-carboxylate (2 g.) in acetic acid (20 ml.) was treated with hydrogen peroxide (1.04 ml., 30%) and heated on the steam-bath for 16 hours. The solution was cooled and the solid filtered off and recrystallised from acetic acid. The product had a M.P. of 235–238° C., undepressed by an authentic sample of ethyl 6 - n - decyloxy - 7 - ethoxy - 4 - hydroxyquinoline - 3-carboxylate prepared as described in Example I, and identical with it by thin-layer chromatography.

The 4-methylmercapto compound used as starting material was prepared as follows:

Ethyl 6 - n - decyloxy - 7 - ethoxy - 4 - mercaptoquinoline-3-carboxylate (2.0 g.; prepared as described in Example VII) in dimethylformamide (10 ml.) was treated with a 50% suspension of sodium hydride in mineral oil (0.12 g.) and, after evolution of hydrogen had ceased, with methyl iodide (0.37 ml.). The solution was heated on the steambath for 1 hour and poured into water. The solid product was recrystallised from methanol to give ethyl 6-n-decyloxy-7-ethoxy-4-methylmercaptoquinoline-3-carboxylate as a cream solid (1.4 g.) M.P. 82–83° C.

EXAMPLE IX

Bis - (3 - ethoxy - 4 - n - decyloxyphenyl)formamidine (14 g.), diethyl malonate (10 g.), ethyl orthoformate (2 g.) and ammonium chloride (0.25 g.), were heated together under nitrogen at 125–130° C. (bath temperature) for 2 hours. A further portion of ethyl orthoformate (2 g.) was added and the mixture was heated for 1 hour. The ethanol present was then allowed to distil from the mixture while heating was continued for a further 6 hours. The mixture was cooled and diluted with benzene (100 ml.), hydrochloric acid (ca. 10 ml. of a 30% solution) was added, and the benzene layer was washed with water (3×10 ml.), dried and evaporated. The residual oil was refluxed in "Dowtherm" (50 ml.) for 30 minutes and the solution was poured into light petroleum (B.P. 100–120° C., 500 ml.). The gelatinous solid was centrifuged off and mixed with glacial acetic acid (ca. 30 ml.). Centrifuging of this mixture gave an oily solid which was crystallised from glacial acetic acid to give ethyl 6-n-decyloxy - 7 - ethoxy - 4 - hydroxyquinoline - 3 - carboxylate, M.P. 244–245.5° C., identical with a sample prepared as in Example 1.

The bis - (3 - ethoxy-4-n-decyloxyphenyl)formamidine was obtained as follows:

1-(4-amino-2-ethoxyphenoxy)-n-decane, prepared as described in Example II from 1-(2-ethoxy-4-nitrophenoxy)-n-decane (64.6 g.), was refluxed for 2½ hours with ethyl orthoformate (15 ml.) (bath temperature 145° C.). The ethanol produced in the reaction was distilled off, and the product diluted with an equal volume of light petroleum (B.P. 80–100° C.), then cooled, yielding a solid (48 g., M.P. 61.5–63.5° C.). Recrystallisation gave bis - (3-ethoxy - 4 - n-decyloxyphenyl)formamidine (42.5 g.), M.P. 62.5–64.5° C.

EXAMPLE X

3 - cyano - 6-n-decyloxy-7-ethoxy-4-hydroxyquinoline (0.5 g.) was dissolved in hot ethyl Cellosolve (15 ml.) and potassium hydroxide (0.75 g.) and water (5 ml.) were added and the mixture boiled under reflux for 4 hours. After cooling, the mixture was diluted with water, and acidified with 2 N hydrochloric acid. The solid was collected and recrystallised from ethanol to give unchanged starting material, M.P. 315–318° C. After standing overnight, the ethanol liquors deposited a pale cream solid, M.P. 240–255° C. (decomp.), which was recrystallised from ethanol to give 6-n-decyloxy-7-ethoxy-4-hydroxyquinoline-3-carboxylic acid, M.P. 259–264° C. (decomp.), which was converted into its ethyl ester by the method of Example IV.

The 3-cyano-6-n-decyloxy-7-ethoxy-4-hydroxyquinoline was prepared as follows:

4-n-decyloxy-3-ethoxynitrobenzene (25 g.) in methanol (175 ml.) was catalytically reduced and the solution was evaporated at atmospheric pressure under nitrogen. To the residue was added ethyl orthoformate (11.5 g.) and ethyl cyanoacetate (17.5 g.), and the mixture was stirred and heated at 165° C. until almost the theoretical amount of ethanol had distilled out (2 hours). The residue was cooled and recrystallised once from methanol and twice from cyclohexane giving ethyl α-cyano-β-(4-n-decyloxy-3-ethoxyanilino)acrylate, M.P. 105–107° C. This ester (15 g.) was added to gently refluxing "Dowtherm" (75 ml.), and refluxed with stirring for 4 hours, using a short air condenser so that the ethanol formed in the reaction could escape. The mixture was allowed to cool and was diluted with light petroleum (B.P. 40–60° C.). The brown solid was collected and recrystallised from dimethylformamide to give 3-cyano-6-n-decyloxy-7-ethoxy-4-hydroxyquinoline, M.P. 325–327° C.

EXAMPLE XI

Ethyl 6-n-decyloxy-4,7-dihydroxyquinoline-3-carboxylate (377 mg.) and sodium hydride (58 mg., 50% w./w. in oil) were warmed together in dimethylformamide (5 ml.). Ethyl toluene-p-sulphonate (200 mg.) was added and the mixture was heated under reflux for 1 hour, and poured into water. The precipitate was filtered off, washed with water, dried and crystallised from ethanol giving a colourless solid, M.P. 232–9° C. Recrystallisation from methanol gave ethyl 6-n-decyloxy-7-ethoxy-4-hydroxyquinoline-3-carboxylate, M.P. 236–240° C., undepressed by a sample prepared as in Example I.

The 4,7-dihydroxyquinoline derivative used as starting material was prepared as follows:

1-(2-hydroxy-4-nitrophenoxy)-n-decane, prepared as described in Example II, was acetylated with acetic anhydride and pyridine. The product, 3-acetoxy-4-n-decyloxynitrobenzene (6.87 g.), in ethyl acetate (50 ml.) was hydrogenated over 5% Pd-charcoal (0.85 g.) at 40° C. and normal pressure. After reduction was complete, the catalyst was removed and the filtrate was taken to dryness in vacuo giving the amine (6.25 g.). This was treated with diethyl ethoxymethylenemalonate (4.9 g.) and the mixture was heated on the steam bath for 10 minutes before it was slowly poured into boiling "Diphyl" (120 ml.). The mixture was allowed to boil for 20 minutes after the addition was complete and was then cooled rapidly to room temperature. The product was filtered off, washed with light petroleum and crystallised from dimethylformamide giving ethyl 7-acetoxy-6-n-decyloxy-4-hydroxyquinoline-3-carboxylate, M.P. 240–242° C. This product (0.45 g.) and potassium bicarbonate (0.11 g.) were heated together under reflux in methanol (100 ml.) and water (10 ml.) for 30 minutes. The solvent was removed in vacuo, water was added, the precipitated product was filtered off, washed with water and crystallised from methanol, giving ethyl 6-n-decyloxy-4,7-dihydroxyquinoline-3-carboxylate, M.P. 214–216° C.

EXAMPLE XII

Ethyl 7 - allyloxy-6-n-decyloxy-4-hydroxyquinoline-3-carboxylate (0.86 g.) in glacial acetic acid (100 ml.) was hydrogenated over 5% Pd-charcoal (0.3 g.) at 60–65° C. and normal pressure. After one mole of hydrogen had been taken up the catalyst was filtered off and the filtrate was evaporated to dryness in vacuo. The residue was triturated with ethanol giving ethyl 6-n-decyloxy-4-hydroxy - 7 - n-propoxyquinoline-3-carboxylate, M.P. 240–242° C., undepressed by a sample prepared as in Example II.

The 7-allyloxyquinoline derivative used as starting material was obtained by the method of Example III from 1-(2-allyloxy-4-nitrophenoxy)-n-decane, M.P. 36–38° C., itself prepared by the method of Example II from 1-(2-hydroxy-4-nitrophenoxy)-n-decane and allyl bromide.

EXAMPLE XIII

Ethyl 6-n-decyloxy-7-ethoxy-4-hydroxyquinoline-3-carboxylate (10.0 g.; prepared as described in Example I) suspended in dimethylformamide (100 ml.) was treated with sodium hydride (50% suspension in mineral oil, 1.26 g.) and stirred with gentle warming on a steambath for 10 minutes, giving a solution of the sodium salt of ethyl 6 - n - decyloxy-7-ethoxy-4-hydroxyquinoline-3-carboxylate.

EXAMPLE XIV

A mixture of ethyl 6-n-decyloxy-7-ethoxy-4-hydroxyquinoline-3-carboxylate (4.17 g.; prepared as in Example I), potassium hydroxide (0.56 g.) and ethanol (200 ml.) was warmed on a steam-bath until a clear solution was obtained. The solution was then cooled to laboratory temperature and clarified with "Hyflo Supercel" to give a clear solution containing the potassium salt of ethyl 6 - n - decyloxy-7-ethoxy-4-hydroxyquinoline-3-carboxylate.

According to a further feature of the present invention, there are provided compositions suitable for administration to chickens to prevent coccidiosis, including concentrates for addition to chicken feedstuff or drinking water, comprising, as a coccidiostat, at least one quinoline derivative of Formula III, or non-toxic salt thereof, in association with a physiologically innocuous carrier. By the expression "physiologically innocuous carrier" as used herein is meant a carrier which is not harmful to the chicken. The carrier may be a solid or semi-solid or a liquid. Such compositions are conveniently produced by intimately dispersing the active ingredient through the carrier, if necessary, where the carrier is a liquid in which the active substance is but sparingly soluble, e.g. water, using an emulsifying, dispersing, suspending or wetting agent. Preferred compositions are solids or semi-solids in which the carrier is provided at least in part by a chicken foodstuff, i.e. an organic or mineral substance which is intended to be fed to the chicken; that is to say, the active ingredient may be incorporated in a solid or semi-solid foodstuff. Incorporation of the active ingredient in the foodstuff, which may be a commercial starter, grower, layer or breeder feed, may be effected by any conventional method such as stirring, tumbling or grinding. Compositions of varying concentrations can be prepared by altering the ratio of carrier to active ingredient. The active ingredient may also be incorporated in the foodstuff in the form of a powder concentrate containing active ingredient and a solid, physiologically innocuous carrier, e.g. wheat middlings, talc, kaolin or chalk or a diatomaceous earth, such as kieselguhr, or a mixture thereof, and such compositions are also included within the scope of this invention. These compositions may also contain agents to promote adhesion of the active ingredient to the carrier, for example soya oil. To the active ingredient or powders containing it, there may be added before admixture with the foodstuff, one or more physiologically innocuous wetting and/or dispersing agents, for example, the condensation product of β-naphthalene sulphonic acid and formaldehyde, sodium lauryl sulphate or polyoxyethylene (20) sorbitan monooleate. Alternatively, when a wetting, suspending, emulsifying, or dispersing agent is added to the active ingredient or powder, the composition so obtained may be mixed with water to provide stable dispersions suitable for addition to foodstuffs.

Compositions suitable for addition to foodstuffs which comprise the active substance in association with a wetting, suspending, dispersing or emulsifying agent, with or without a physiologically innocuous carrier, are also included within the scope of this invention. The compositions of the invention suitable for the prevention of coccidiosis in chickens, may, if desired, also contain one or more additional prophylactic or therapeutic agents, for example antibacterial agents such as furazolidone, and coccidiostats such as 2-chloro-4-nitrobenz-amide, pyridine-3-sulphonomide, sulphaquinoxaline or nitrofurazone, through the inclusion of such additional coccidiostats is, in general, neither necessary or desirable. Also they may contain other substances known to be useful in promoting the growth of poultry or their egg production such as, for example, 4-hydroxy-3-nitrophenylarsonic acid and antibiotics such as penicillin and penicillin derivatives.

Liquid compositions may be dispersions of the active ingredient in drinking water, and these compositions may be prepared from concentrates which may be added to water, or are self-emulsifying with water. Such concentrates comprise the active ingredient in association with a wetting, suspending, dispersing or emulsifying agent, with or without a physiologically innocuous carrier, or in association with a water-soluble physiologically innocuous carrier, and are included within the scope of this invention. Examples of these concentrates are:

(1) Mixtures of the active ingredient with a wetting or dispersing agent;

(2) Powders comprising the active ingredient, a physiologically innocuous carrier, and a wetting, suspending or dispersing agent;

(3) Stable dispersions obtained by mixing concentrates of types (1) or (2) with water; and (4) Mixtures of the active ingredient with a water-soluble physiologically innocuous carrier, e.g. sucrose or glucose.

It is also possible to administer the compounds of the present invention orally to chickens in the form of granules, pellets, suspensions, solutions and emulsions comprising the active quinoline ingredient in association with suitable physiologically innocuous carriers and adjuvants. Such administration is, however, generally less convenient and therefore such compositions are not preferred.

The compositions of the invention may contain from about 0.0001% to about 90% by weight of one or more of the compounds of Formula III. Concentrates for addition to chicken feed generally contain from about 1% to about 90% by weight of one or more of the compounds of Formula III, and preferably about 4–50% by weight absorbed on or mixed with a carrier. As already mentioned, foodstuffs generally contain 0.0001% to 0.05% of the active compound.

The amount of active quinoline compound required for effective prophylactic control of coccidiosis in chickens is very low. Good results have been obtained in the prevention of disease due to E. tenella and E. acervulina by the administration in feed of a quantity of quinoline derivative of Formula III equal to about 0.0002% to 0.05% by weight of the food consumed. Optimum results are usually obtained by the administration of a quantity of active ingredient equal to about 0.001% to about 0.025%, and particularly 0.001% to 0.004%, by weight of the food consumed, more especially with the individual compounds of particular value hereinbefore mentioned. Moreover, methyl 4-hydroxy-7-isopropoxy-6-n-octyloxyquinoline-3-carboxylate and ethyl 4-hydroxy-7-isopropoxy-6-n-octyloxyquinoline-3-carboxylate have been found to be effective prophylactically against E. tenella and E. acervulina when administered in a quantity equal to 0.001% by weight of the food consumed, while methyl 7-ethoxy-4-hydroxy-6-n-octyloxyquinoline - 3 - carboxylate, methyl 6-n-decyloxy-7-ethoxy-4-hydroxyquinoline-3-carboxylate and ethyl 6-n-decyloxy-7-ethoxy-4-hydroxyquinoline-3-carboxylate have been found to give effective prophylactic control of these organisms when administered in a quantity equal to 0.0002–0.0005% w./w. in the feed. Furthermore, the quinoline derivatives of Formula III, and more particularly the preferred compounds, are highly active in the prevention of infections caused by other species of Eimeria, including the important species E. necatrix, E. maxima and E. brunetti when administered in similar concentrations in the feed. For example, ethyl 6-n-decyloxy-7-ethoxy-4-hydroxyquinoline-3-carboxylate has been found to be effective prophylactically in preventing disease caused by E. necatrix when administered in a quantity equal to 0.002% to 0.004% w./w. in the feed and in preventing disease caused by E. maxima and E. brunetti when administered in a quantity equal to 0.001% w./w. in the feed.

It will be appreciated that when concentrates in the form of pellets or granules are employed as the means for administration of the quinoline derivatives, the proportion of quinoline compound present in the pellets or granules themselves is considerably higher than the above-mentioned proportions suitable in foodstuffs for the effective prophylactic control of coccidiosis, and that the concentrates can be distributed throughout a chicken foodstuff so as to give, on average over the whole of the feed, an amount of 0.0001% to 0.05% by weight of the quinoline compound.

Advantageously, the average particle size of the quinoline compound of Formula III incorporated in the chicken feedstuff is from about 1 to about 50 microns, and is preferably less than 30 microns.

The following examples illustrate compositions according to the present invention; the percentages stated are by weight.

EXAMPLE XV

Ethyl 6-n-decyloxy-7-ethoxy-4-hydroxyquinoline-3-carboxylate (18 parts by weight) was added to wheat middlings (82 parts by weight), and intimately mixed. The mixture was incorporated in a foodstuff suitable for chickens to give a final concentration of 0.002% to 0.004% by weight of quinoline derivative. The treated foodstuff was suitable for feeding to chickens to prevent coccidiosis caused by E. tenella, E. acervulina, E. necatrix, E. brunetti and E. maxima.

EXAMPLE XVI

Ethyl 7 - ethoxy-4-hydroxy-6-n-octyloxyquinoline-3-carboxylate (5 parts by weight) was added to limestone flour (20 parts by weight). The mixture was ground and incorporated in a suitable foodstuff for chickens to give a final concentration of 0.002% to 0.004% by weight of quinoline derivative. The treated foodstuff was suitable for feeding to chickens to prevent coccidiosis caused by infections with E. tenella and E. acervulina.

EXAMPLE XVII

Soya oil (3 parts by weight) was sprayed onto stirred wheat middlings (88 parts by weight) to achieve a uniform distribution. Ethyl 6-n-decyloxy-7-ethoxy-4-hydroxyquinoline-3-carboxylate (9 parts by weight) was then added and intimately mixed. The concentrate thus obtained was suitable for incorporation into a foodstuff for chickens to give a final concentration of 0.002%–0.004% by weight of quinoline derivative. The treated foodstuff was suitable for feeding to chickens to prevent coccidiosis caused by *E. tenella, E. acervulina, E. necatrix, E. brunetti* and *E. maxima*.

EXAMPLE XVIII

A composition containing the following ingredients:

| | G. |
|---|---|
| Ethyl 6 - n - decyloxy-7-ethoxy-4-hydroxyquinoline-3-carboxylate | 5 |
| Sucrose | 92 |
| Sodium lauryl sulphate | 3 | was prepared by grinding the ingredients together. The resulting mixture when added to drinking water at the rate of 0.8 g. per litre provided a concentration of 0.004% of active substance in the water.

EXAMPLE XIX

Ethyl 6-n-decyloxy-7-ethoxy-4-hydroxyquinoline-3-carboxylate (1 g.) was ground up with distilled water (5 ml.). Tragacanth mucilage (1.25%; 3 ml.) was added, and the mixture was made up to 10 ml. with distilled water. The final suspension was suitable for oral administration to chickens.

EXAMPLE XX

Ethyl 6-n-decyloxy-7-ethoxy-4-hydroxyquinoline-3-carboxylate (50 mg.) was mixed with Cremaphor E1 (0.1 ml.) and a little water, and the mixture was ground to a fine suspension then diluted with water to a total volume of 5 ml. The final suspension was suitable for oral administration to chickens.

Similar compositions as described in any one of Examples XV to XXI may be prepared wherein the stated quinoline derivative is replaced by another of the compounds of Formula III, or salt thereof, more particularly one of the preferred compounds, for example, ethyl 4-hydroxy - 7 - isopropoxy-6-n-octyloxyquinoline-3-carboxylate, methyl 4-hydroxy-7-isopropoxy-6-n-octyloxyquinoline-3-carboxylate, methyl 7-ethoxy-4-hydroxy-6-n-octyloxyquinoline-3-carboxylate, or methyl 6-n-decyloxy-7-ethoxy-4-hydroxyquinoline-3-carboxylate.

We claim:
1. A compound of the formula:

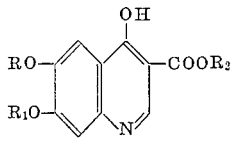

in which R is n-alkyl of 8 to 10 carbon atoms, $R_1$ is methyl, ethyl, n-propyl, isopropyl, or sec-butyl, and $R_2$ is methyl or ethyl, and their non-toxic salts.

2. Ethyl 4-hydroxy-7-isopropoxy-6-n-octyloxyquinoline-3-carboxylate.
3. Methyl 4 - hydroxy-7-isopropoxy-6-n-octyloxyquinoline-3-carboxylate.
4. Methyl 7-ethoxy-4-hydroxy-6-n-octyloxyquinoline-3-carboxylate.
5. Methyl 6-n-decyloxy-7-ethoxy-4-hydroxyquinoline-3-carboxylate.
6. Ethyl 6 - n-decyloxy-7-ethoxy-4-hydroxyquinoline-3-carboxylate.
7. Methyl 6 - n-decyloxy-4-hydroxy-7-isopropoxy-quinoline-3-carboxylate.
8. Methyl 4-hydroxy-7-isopropoxy-6-n-nonyloxy-quinoline-3-carboxylate.

References Cited

UNITED STATES PATENTS

| | | | |
|---|---|---|---|
| 3,267,106 | 8/1966 | Watson | 260—287 |
| 3,290,315 | 12/1966 | Watson | 260—287 |
| 3,397,208 | 8/1968 | Berman et al. | 260—287 |
| 3,414,576 | 12/1968 | Cairns et al. | 260—287 |

OTHER REFERENCES

Spencer et al., Jour. Med. Chem. vol. 9, pp. 934–6, (1966).

DONALD G. DAUS, Primary Examiner

U.S. Cl. X.R.

260—471, 571, 485, 566, 465, 645, 294.8; 424—250